No. 737,989. PATENTED SEPT. 1, 1903.
A. P. WOLFE.
MACHINE FOR MAKING CAN BODIES.
APPLICATION FILED JAN. 23, 1902.
NO MODEL. 9 SHEETS—SHEET 8.

No. 737,989. Patented September 1, 1903.

UNITED STATES PATENT OFFICE.

ARTHUR P. WOLFE, OF BUFFALO, NEW YORK, ASSIGNOR TO NIAGARA MACHINE AND TOOL WORKS, OF BUFFALO, NEW YORK.

MACHINE FOR MAKING CAN-BODIES.

SPECIFICATION forming part of Letters Patent No. 737,989, dated September 1, 1903.

Application filed January 23, 1902. Serial No. 90,365. (No model.)

*To all whom it may concern:*

Be it known that I, ARTHUR P. WOLFE, a citizen of the United States, residing at Buffalo, in the county of Erie and State of New York, have invented new and useful Improvements in Machines for Making Can-Bodies, of which the following is a specification.

This invention relates to a machine for making can-bodies, in which the blank or flat sheet from which the body is formed is first carried between opposite edge-folding devices, which turn the longitudinal edges of the blank one up and the other down to form seam hooks or flanges and is then carried to a stationary forming-horn around which the flanged blank is formed into body shape by forming devices, after which the seam-hooks, which are caused to interlock by the expansion of the horn, are pressed to lock the seam by a hammer, and the body is then carried to the soldering device, which applies solder to the seam.

The principal object of the invention is to produce a machine of the kind stated of simple and desirable construction and in which can-bodies of different sizes and forms can be made with but slight changes and few adjustments in the machine.

In the accompanying drawings, consisting of nine sheets.

Like letters of reference refer to like parts in the several figures.

The main frame of the machine for supporting the several operating parts may be of any suitable construction. It preferably has a comparatively low front portion A, which supports the edge-folding mechanism, and separated upright frame members A' A² in rear of the low front portion. The stationary forming-horn, body-forming mechanism, and seam-locking hammer are located between the uprights A' A². The front portion of the frame is provided with horizontal transversely-arranged separated rails or guide-bars a, on which carriages B B' are mounted to slide toward and from each other. b b' represent supporting arms or brackets, which project forwardly from the carriages and constitute a support for the blanks or sheets from which the can-bodies are formed. The arms or brackets are provided with top horizontal supporting-faces $b^2$ for the blanks and with raised flanges or ribs $b^3$, which confine the blanks and guide the same while they are being moved by the primary conveyer to the edge-folding mechanism.

Suitable means are provided for moving the carriages toward and from each other to accommodate blanks for cans of different diameters and for holding the carriages in the position to which they are adjusted. The preferred means for this purpose is constructed as follows: C, Figs. 6, 9, 14, and 15, represents a screw-shaft, which is arranged horizontally in the front portion of the frame between the horizontal guide-rails a and journaled in a suitable bearing c at the center of the front rail a. This screw-shaft has secured thereto a worm-wheel c' near the center of the shaft, which meshes with a worm $c^2$ on a shaft journaled in the front frame-rail a and extending in front of the same. This shaft is provided at its front end with a hand-wheel or the like $c^4$ for turning the same. The screw-shaft is provided at opposite sides of its center with oppositely-pitched screw-threads $c^5$, which engage in correspondingly-threaded lugs $c^6$, secured to the carriages B B' and extending between the separated frame-rails a. By turning the hand-wheel $c^4$ the carriages can be moved toward or from each other. They are held in position to which they are adjusted by suitable means, such as clamping-bolts $c^7$, Figs. 9 and 14.

The primary conveyer for carrying the blanks from the support to the edge-folders preferably comprises two separated endless chains D, which are provided at suitable intervals with dogs or teeth d, which engage the blanks and move the same rearward on the supports b b'. The feed-chains are arranged on the inner or opposing sides of the carriages and supporting-arms and run on sprocket-wheels d', journaled at the front of the arms, and sprocket-wheels $d^2$ at the rear of the carriages. The sprocket-wheels d' at the front of the arms are preferably adjustable in any suitable manner, so as to properly tension the conveyer-chains—for instance, the wheels are carried by short shafts which project through horizontal elongated slots in the forward ends of the arms. Set-screws $d^3$ are provided for adjusting the shafts, and jam-nuts on the ends of the shafts for locking the same tightly in the position to which they are adjusted. The sprocket-wheels $d^2$ for the rear ends of the conveyer-chains are mounted on a transversely-arranged shaft $d^4$, which is journaled in a bearing $d^5$ at one end of the front portion A of the frame and passes through guide-bearings $d^6$ on the rear of the carriages. The rear sprocket-wheels are mounted to slide longitudinally on the shaft $d^4$ and caused to rotate therewith by suitable means, such as a feather or key engaging in a longitudinal groove $d^7$ in the shaft $d^4$. The sprocket-wheels are caused to move with the carriages B B', when the same are adjusted toward and from each other, by arms $d^8$, which are secured to the carriages and surround the shaft $d^4$ on the inner sides of the sprocket-wheels.

Figures 4, 29, 30:
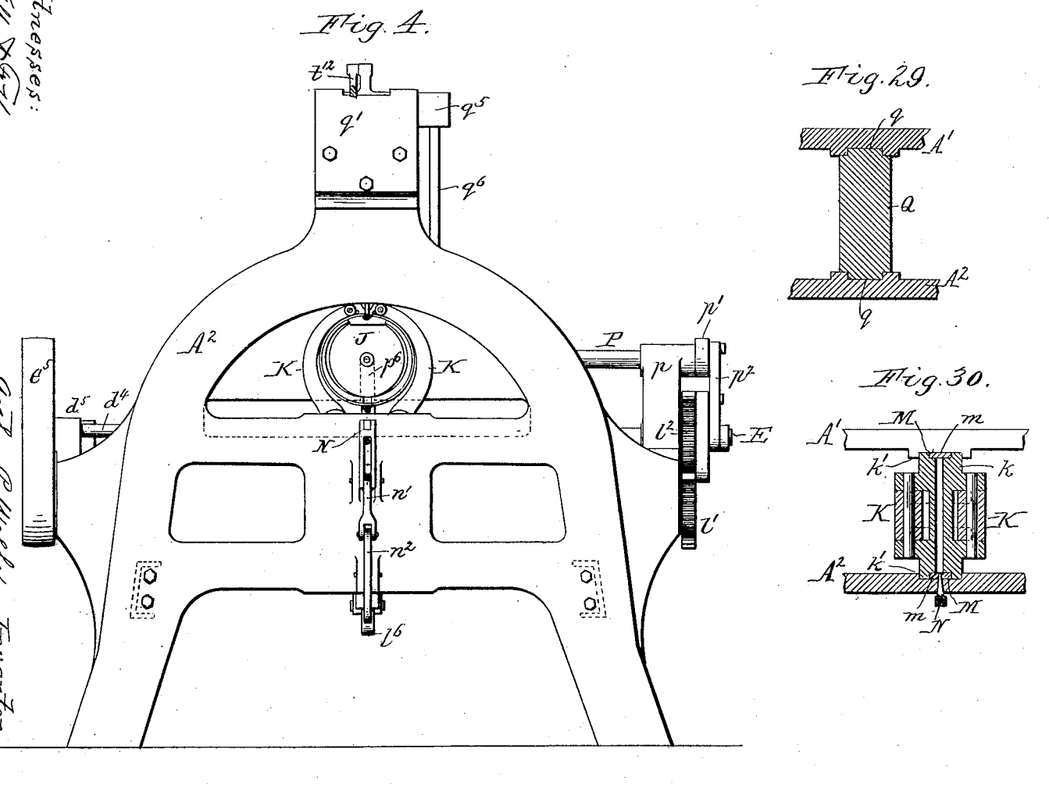
Fig. 4 is a rear elevation of the machine, with the horn extension and soldering device removed.
Fig. 29 is a horizontal section on line 29 29, Fig. 1, through the seam-closing hammer and the guides therefor.
Fig. 30 is a horizontal section on the line 30 30, Fig. 1.
Figure 5:
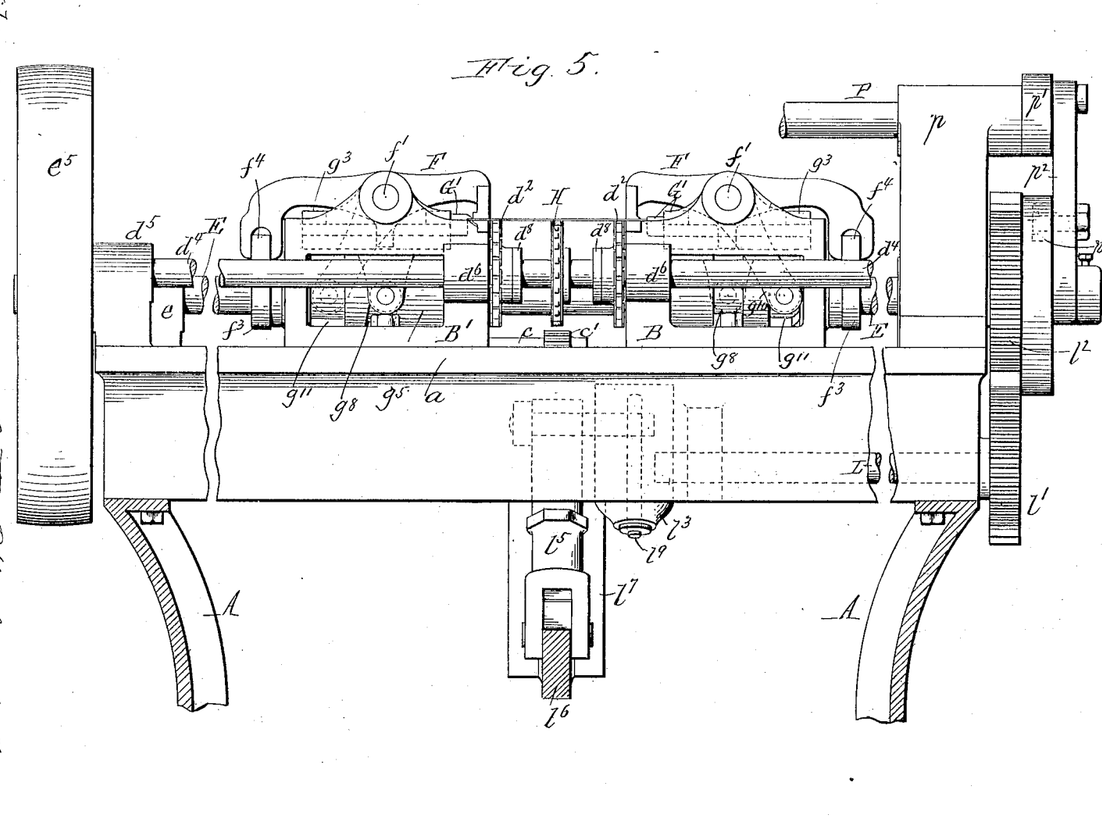
Fig. 5 is an enlarged transverse sectional elevation on line 5 5, Fig. 1, and showing the edge-folding mechanism.
Figure 6:
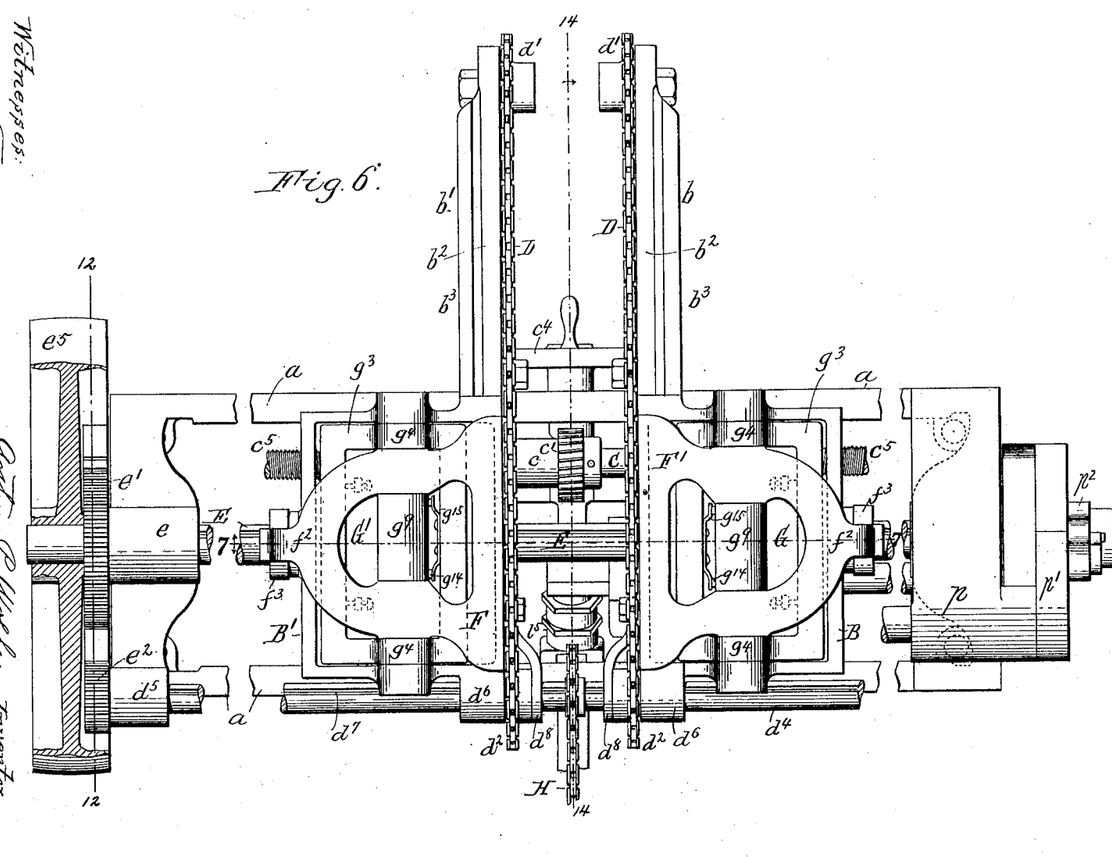
Fig. 6 is an enlarged plan view, partly in section, of the edge-folding mechanism and feed-chains.
Figure 7:
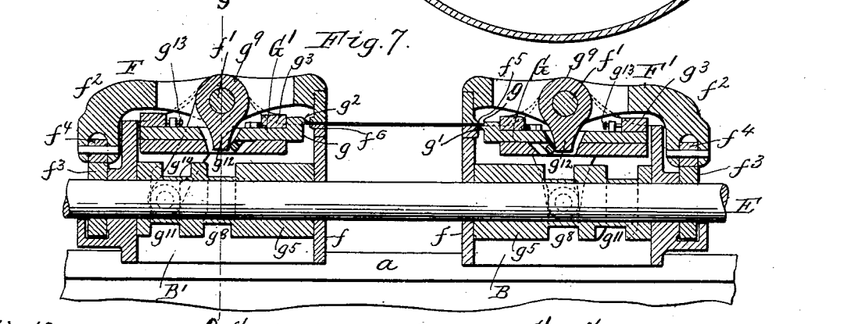
Fig. 7 is a transverse sectional elevation through the edge-folding mechanism on the line 7 7, Fig. 6, looking toward the front of the machine.
Figures 8, 13:
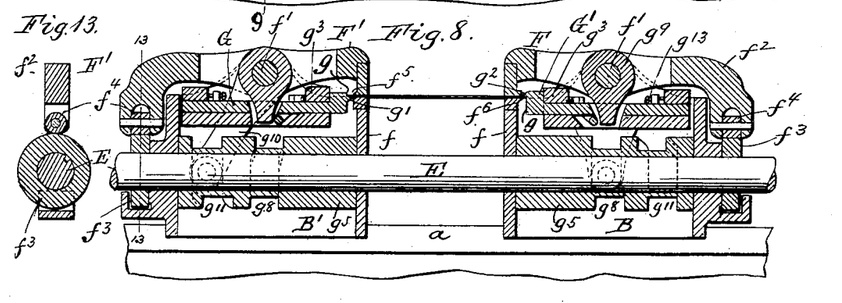
Fig. 8 is a similar view on the same line looking toward the rear of the machine.
Fig. 13 is a section through the operating-cam for one of the clamping-levers of the edge-folding mechanism on the line 13 13, Fig. 8.
Figure 9:
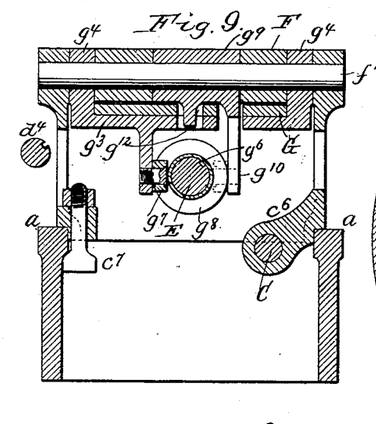
Fig. 9 is a sectional view on the line 9 9, Fig. 7.
Figure 12:
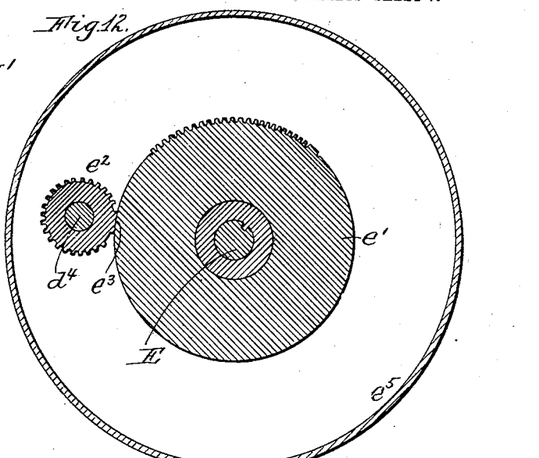
Fig. 12 is an enlarged section showing the driving-pulley and gear for driving the intermittent primary conveyer.
Figures 14, 16, 17:
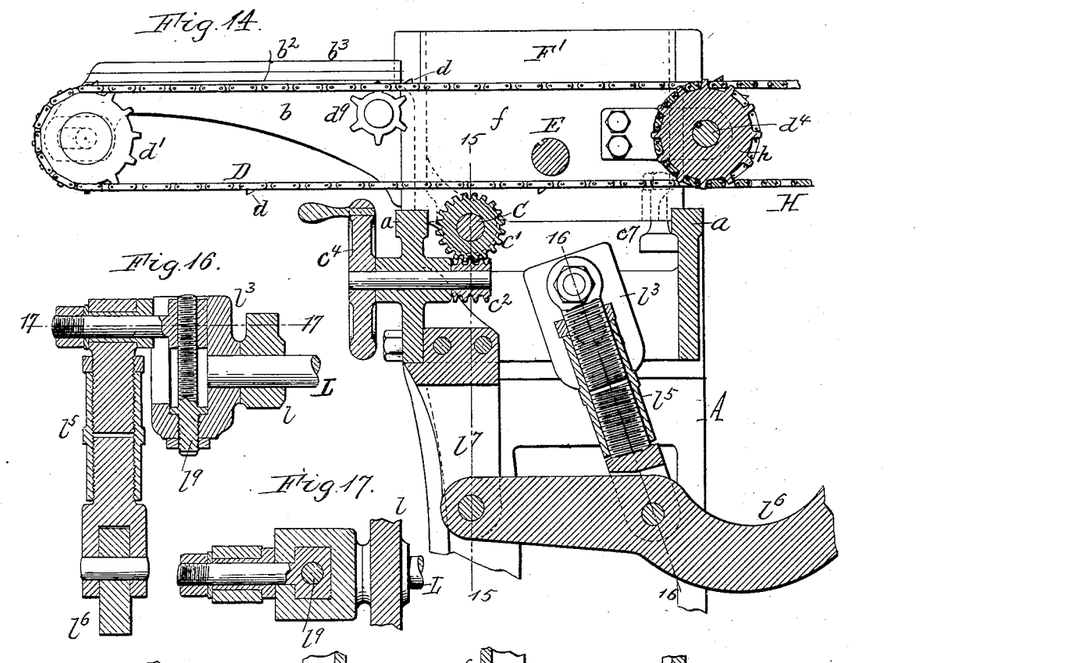
Fig. 14 is an enlarged longitudinal sectional elevation on line 14 14, Fig. 6, of the machine.
Fig. 16 is a sectional elevation on the line 16 16, Fig. 14.
Fig. 17 is a sectional view on the line 17 17, Fig. 16.
Figure 15:
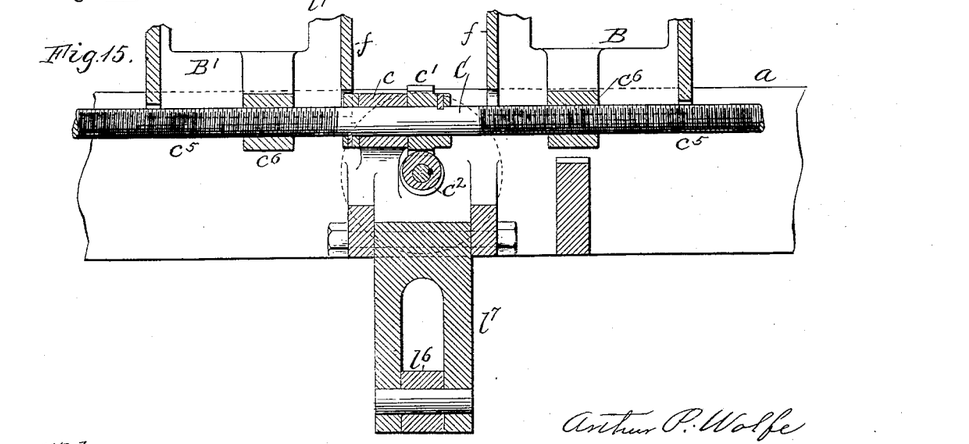
Fig. 15 is a sectional view on the line 15 15, Fig. 14, showing the adjusting mechanism for the edge-folders.

$d^9$ represents idler-wheels which are journaled in the rear portion of the supporting-arms b b' and prevent the primary conveyer-chains from sagging. The shaft $d^4$ constitutes the drive-shaft for the primary conveyer and is driven intermittently from the main drive-shaft by a suitable mechanism, such as shown in the drawings, Figs. 4, 6, and 12.

E represents the main drive-shaft, which is journaled in suitable bearings e at the ends of the front frame portion A and is provided at one end with a mutilated gear-wheel e', which meshes with a mutilated gear-pinion $e^2$, secured to the shaft $d^4$. The gear-wheel e' is provided with teeth extending through approximately one-fourth of its circumference, the remainder of the periphery being cylindrical. The gear-pinion $e^2$ is provided with a short peripheral concaved portion $e^3$, adapted to contact with the cylindrical portion of the gear-wheel e', and with teeth extending around the remainder of its circumference, the construction being such that the gear-pinion is rotated once during one-quarter of a revolution of the drive-shaft and the gear-wheel e' and is held stationary by the engagement of the concaved peripheral portion of the gear-pinion with the cylindrical face of the gear-wheel during the remaining three-quarters of a revolution of the drive-shaft.

$e^5$ represents a drive-pulley which is secured to the end of the drive-shaft adjacent to said gear-wheel e' and is adapted to be driven by a belt from any suitable source of power. The drive-shaft extends through openings provided therefor in the movable carriages B B' and through the spaces between the upper and lower runs of the chains of the primary conveyer.

The edge-forming mechanism, Figs. 3, 5, 7, 8, and 9, is carried by the two carriages B B' and is preferably constructed as follows: The carriages are in the form of open rectangular frames, the upper faces of the inner walls f of which are substantially in line with and constitute continuations of the supporting-faces $b^2$ of the blank-supporting arms, so that the primary conveyer can carry the blanks from their support onto the upper faces of the walls $f$. These walls constitute supports for the blanks while the edges are being folded.

F F' represent clamping-levers, one pivoted on a longitudinal horizontal shaft $f'$ on each carriage, so as to swing at its inner end toward and from the upper face of the inner wall of its carriage to clamp and release the blank. The outer end $f^2$ of each clamping-lever extends toward a cam $f^3$, mounted on the drive-shaft E adjacent to the outer wall of the carriage, and is preferably provided with an antifriction-roller $f^4$, with which the cam engages. The jaw of the clamping-lever F' is provided with a beveled face $f^5$, on which one edge of the blank is folded upwardly, and the inner wall $f$ of the opposite carriage B' is provided with a beveled face $f^6$, on which the opposite edge of the blank is folded downwardly.

G G' represent the folding-tools, which are arranged horizontally one beneath each clamping-lever. The folding-tools are provided at their inner or opposite ends with vertical faces $g$, which constitute gages for centering the blank on the supporting-faces of the carriages beneath the clamping-levers. The folder G is provided with a lip $g'$, having a flat upper face which engages under the adjacent edge of the blank and a beveled under face, while the folder G' is provided with a lip $g^2$, having a flat under face which engages over the adjacent edge of the blank and a beveled upper face. Each folder is mounted to slide toward and from the blank in a swinging frame $g^3$, which is hung, so as to oscillate on the shaft $f'$, by bearing-ears $g^4$, rising from the frame and straddling the clamping-lever. The swinging frame for the folder G is tilted upwardly, which causes the lips of the folder to bend the adjacent edge of the blank up, and the other swinging frame is tilted downwardly, whereby the lip of the other folder bends the opposite edge of the blank down. The folders are then moved toward each other, whereby the beveled faces of the lips coöperating with the beveled faces on the clamping-lever and carriage-wall, respectively, fold the edges over into the final hooked form. The means for accomplishing these movements of the folders is constructed as follows:

$g^5$ represents cam-sleeves, one surrounding the drive-shaft E in each carriage and abutting at its opposite ends against the inner and outer walls of the latter. The cam-sleeves are caused to rotate with the shaft by keys $g^6$ on the sleeves engaging in the key-grooves in the shaft, and they are free to move with the carriages when the latter are adjusted toward and from each other. Each swinging folder-frame is provided with an arm which extends downwardly at one side of the adjacent cam-sleeve and is provided with an antifriction-roller $g^7$, which engages in a cam-groove $g^8$, formed in the cam-sleeve.

$g^9$ represents sleeves, one of which is loosely mounted on each of the shafts $f'$ in an opening provided therefor in the clamping-lever. Each sleeve has a lever-arm $g^{10}$, which extends down through openings in the folder and swinging folder-frame beside the cam-sleeve and is provided with a roller which works in a cam-groove $g^{11}$ in the adjacent cam-sleeve.

$g^{12}$ represents an arm fixed on the sleeve $g^9$ and projecting down through an opening in the folder and engaging with a small roller secured to the under side of the folder and depending into an enlarged opening in the swinging folder-frame. The arrangement of the levers and cams is such that the swinging folder-frames are first swung to tilt the folding-tools one up and the other down, and the folding-tools are then moved inwardly or toward each other while the folding-frames are in their inclined or tilted positions. Preferably each folding-tool is provided near its outer end with upwardly-extending lugs, in which work set-screws $g^{13}$, adapted to contact with the outer bars of the swinging folder-frames. Near its inner end each folding-tool is provided with upwardly-projecting stops $g^{14}$, adapted to bear against a springs $g^{15}$, secured to the forward bar of the folder-frame. The springs act to retract the folding-tools or move the same away from each other, and the extent of this outward movement of the tools may be predetermined by the set-screws $g^{13}$. The springs do not prevent the complete inward movement of the folding-tools necessary to form the hooks. This construction enables the folding-tools to be set nearer to or farther from each other, so as to accommodate blanks which vary slightly in width. As the distance between the folding-faces on the clamping-lever and carriage-wall remain fixed, narrower or wider hooks are formed, according to the width of the blanks. The clamping-levers are held down to clamp the blank until the folding operations are completed, when the clamps are released by their cams and the blank permitted to be removed. The blank is removed and carried from its position in the folding mechanism toward the body-forming mechanism by the primary conveyer. The blank is carried to the edge-folding mechanism and the edges folded while the drive-shaft makes one revolution and is removed by the primary conveyer during the first part of the next revolution of the drive-shaft.

H represents a secondary conveyer, which preferably consists of an endless chain arranged in a plane centrally between the chains of the primary conveyer. The chain runs on and is driven by a sprocket-wheel $h$, fixed on the rear shaft $d^4$ between the sprocket-wheels of the primary conveyer and on a sprocket-wheel $h'$, mounted at the rear end of a frame extension which projects rearwardly from the rear frame upright A². This frame extension preferably comprises a longitudinal slotted or divided member $h^2$, secured at its forward end to the upright member A², and a vertical yoke $h^3$, connected at its upper end to the rear end of the member $h^2$. Suitable upper and lower brace-rods $h^4$ $h^5$ are provided, which are connected at their rear ends to the yoke and at their forward ends to the upright A². The rear sprocket-wheel for the secondary conveyer is preferably adjustably mounted on the yoke by a short shaft $h^6$, which is arranged in horizontal elongated slots in separated depending portions of the yoke. The shaft is adjusted to properly tension the conveyer-chain by means of set-screws $h^7$, working in screw-threaded openings in the yoke and bearing against the opposite ends of the sprocket-wheel shaft, and is held in adjusted position by means of jam-nuts $h^8$ on its opposite ends which bear against the sides of the yoke. The secondary conveyer-chain is provided with dogs or teeth adapted to take hold of the forward edge of the blank or sheet after the same has been released by the teeth of the primary conveyer and carry the same into correct position below the forming-horn. The arrangement of the dogs or teeth on the chains of the two conveyers relative to each other is such that as opposite dogs on the primary conveyer-chains move down around the rear sides of the rear sprocket-wheels a dog on the secondary conveyer moves up around the front side of its sprocket-wheel which is on the same shaft as the rear sprocket-wheels of the primary conveyer and engages the front edge of the blank and carries it to the correct position beneath the horn, when both conveyers come to rest.

Figure 1:
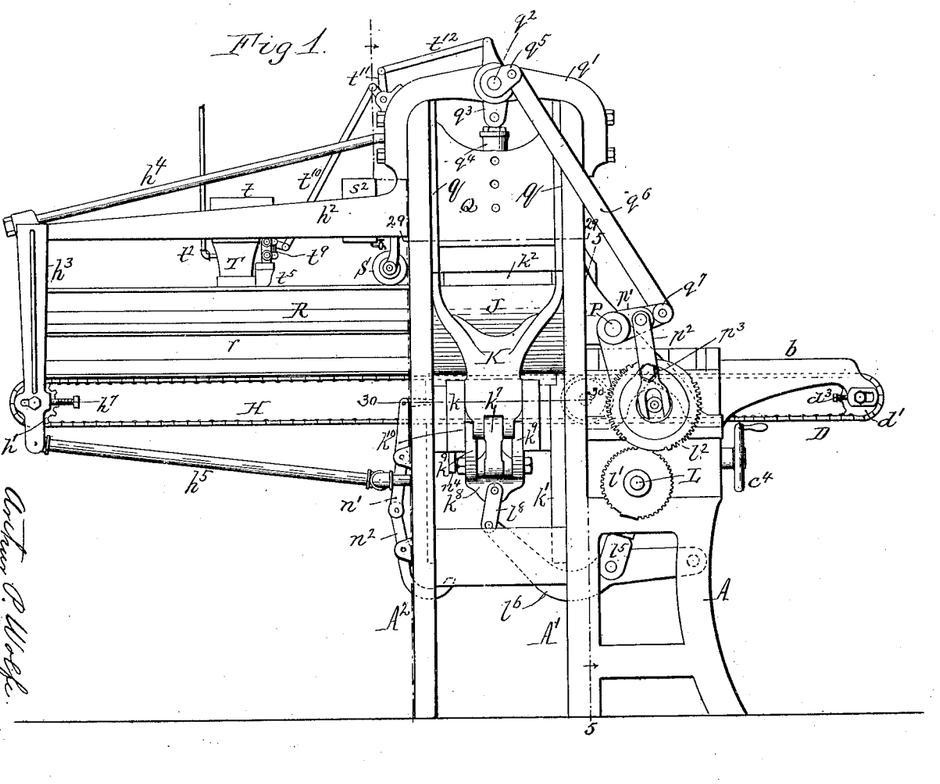
Figure 1 is a side elevation of a can-body forming and soldering machine embodying the invention.
Figures 2, 27, 28:
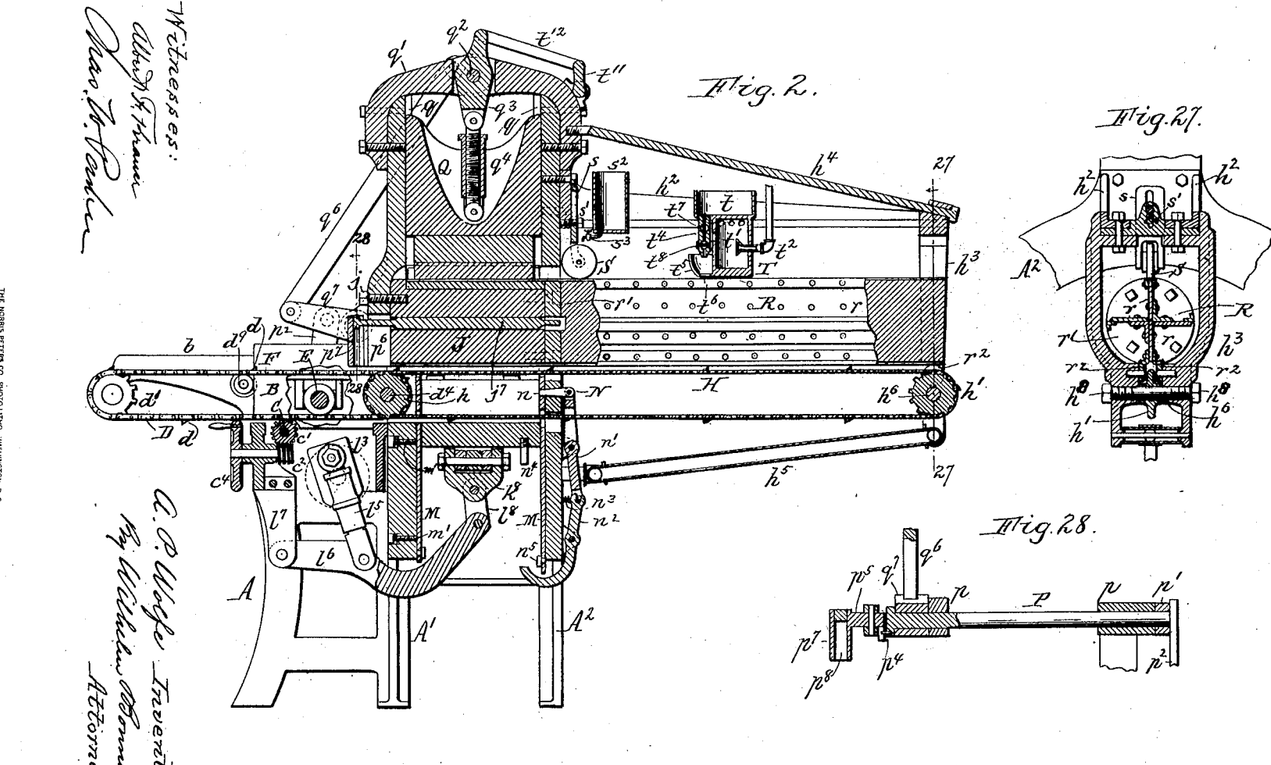
Fig. 2 is a longitudinal sectional elevation through the center of the machine.
Fig. 27 is a sectional view on the line 27 27, Fig. 2, through the horn extension and associated parts.
Fig. 28 is a sectional elevation on the line 28 28, Fig. 2, showing the means for operating the horn-expander.
Figures 18, 19, 20, 21, 22, 23, 24, 25, 26:
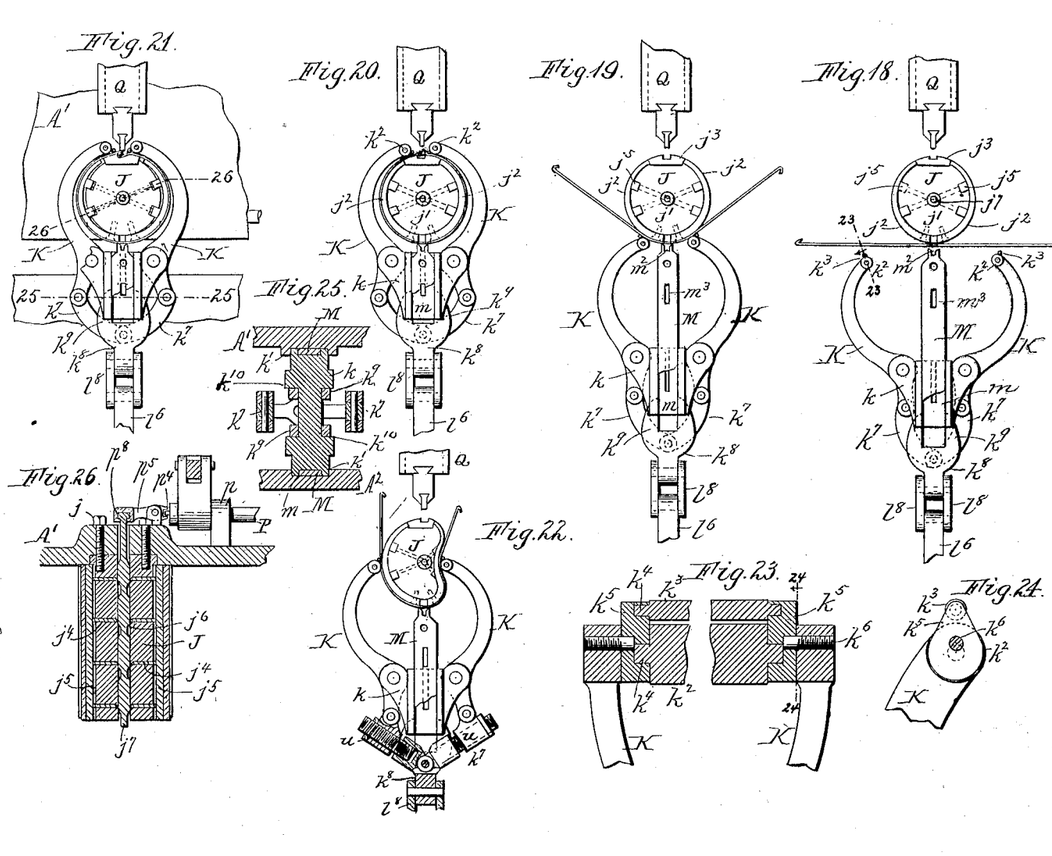
Fig. 18 is a rear elevation, partly broken, showing the horn and body-forming devices in their initial position.
Fig. 19 is a similar view showing the position of the parts at the commencement of the rolling operation.
Fig. 20 is a similar view showing the position of the parts after the blank has been rolled around the horn with the seam-hooks overlapped.
Fig. 21 is a similar view showing the horn expanded and the hammer down, so as to close the seam.
Fig. 22 is a similar view showing a horn and formers of slightly different form.
Fig. 23 is an enlarged section on line 23 23, Fig. 18, showing the forming-rollers on one of the forming-levers.
Fig. 24 is a sectional elevation showing the forming-rollers on the line 24 24, Fig. 23.
Fig. 25 is a sectional view of the sliding head for the forming-levers on the line 25 25, Fig. 21.
Fig. 26 is a sectional view through the horn and associated parts on line 26 26, Fig. 21.

J represents the horn, around which the blank is rolled into the form of the can-body. The horn is arranged horizontally between the front and rear upright frame members A' A² directly over the path of the blank and is detachably secured at its forward end to the rear side of the front upright in any suitable manner—for instance, the front end of the horn is seated in a socket in the upright and is securely held by bolts $j$, as shown in Figs. 2 and 26. The horn, Figs. 18 to 21 and 26, is composed of a central core $j'$ and elastic side pieces $j^2$. The latter are comparatively thin curved steel plates which taper from their lower to their upper ends and are rigidly secured at their thick lower ends to the under side of the core by screws, as indicated in dotted lines, or other suitable means and are free at their thin upper ends. These elastic side pieces or plates extend upwardly on opposite sides of the core and abut with their thin upper ends against the side edges of a raised portion $j^3$, which is formed on the upper side of the core and provided with a longitudinal groove in which the seam-hooks lie while being compressed. The lower ends of these side plates are separated somewhat to provide a longitudinal groove for the passage of the teeth of the secondary conveyer. The horn, formed as described, is oval or elliptical in cross-section, with the major diameter vertical. The horn is expanded to interlock the seam-hooks, as shown in Fig. 21, and for that purpose suitable means are provided for springing the middle portions of the side plates outward. The means shown for that purpose are pins $j^4$, arranged in radial holes in the core and engaging at their outer ends against longitudinal strips $j^5$, located in longitudinal grooves in the core, and at their inner ends against inclined faces $j^6$ on an expanding-rod $j^7$, which is arranged longitudinally in an axial hole in the core. When the expanding-rod is moved inward or rearward, the radial pins are moved outwardly, and the elastic side plates are sprung outward at their middle, so that the horn is expanded horizontally beyond the true circle. When the side plates are released, they return to their normal position, (indicated in Fig. 18,) and the can-body, which has been distorted out of circular form by the expansion of the horn, returns to a true circular form. As these side plates are flexible, their free ends are not thrown out as far as they would be if they were rigid, but are restrained and held back to a certain extent by the can-body upon expanding the horn, so that the plates are sprung or bulged mainly at the middle. This avoids the formation of flat places or creases by the free ends of the side plates in the can-body.

K, Figs. 1, 3, 18 to 24, represents the forming-levers, by which the blank is rolled up around the horn. The levers are arranged one at each side of the central vertical plane of the horn and in the normal position (shown in Fig. 18) are below the path of the blank, which is moved by the secondary conveyer in between the horn and the levers. The levers are pivoted intermediate of their ends to a sliding support or head $k$, which is vertically movable in guideways $k'$, formed on the inner sides of the upright frame members A' A². (See Figs. 25 and 30.) The sliding head is provided with a longitudinal slot, through which the secondary conveyer passes and which permits the head to move vertically without interference with the conveyer-chain. The upper arm of each lever is bowed outwardly, so that when moved upward it can encircle the adjacent half of the horn and the blank thereon without bearing against the same. Each forming-lever is provided at its upper end with a roller, by which it bears against the blank, and the pressure on this roller may be relieved by a supporting-roller. In the drawings, $k^2$ represents the supporting-roller and $k^3$ the forming-roller, which latter is somewhat smaller in diameter than the supporting-roller. The rollers are provided with end journals $k^4$, which turn in holes in bearing-blocks $k^5$, pivoted on pins $k^6$, projecting inward from the bifurcated arms of the forming-levers. The axis of the pins $k^6$ is between the axes of the rollers and nearer to that of the large roller. When the levers press the rollers against the blank, the greater part of the pressure falls on the large roller; but the small roller is held against the blank and readily follows the form of the horn, so as to roll the blank tightly around the same. The lower arms of the forming-levers are connected by links $k^7$ to a yoke $k^8$, by which the levers are actuated and which is provided with upwardly-projecting guide-fingers $k^9$, which embrace the sliding head between shoulders $k^{10}$, formed thereon to guide the yoke in its up-and-down movement on the head.

The yoke actuating the forming-levers is in turn actuated by the following mechanism:

L, Figs. 1, 3, 5, and 14, represents a horizontal crank-shaft journaled parallel with the drive-shaft E and below the same in suitable bearings $l$ in the front frame portion. At its outer end the crank-shaft is provided with a mutilated gear-wheel $l'$, which meshes with and is driven by a mutilated gear-wheel $l^2$ on the drive-shaft at the end thereof opposite to that at which the drive-pulley is secured. The gear-wheel $l'$ is provided at diametrically opposite sides with concave peripheral portions adapted to engage with diametrically opposite circular smooth portions of the gear-wheel $l^2$. The construction of the gear is such that the crank-shaft is turned a half-revolution, then held an instant, and is then turned another half-revolution and held an instant, while the drive-shaft makes one revolution. The crank-shaft is provided at its inner end with a crank $l^3$, the wrist-pin of which is connected by a link $l^5$ to the central portion of a lever $l^6$, which is fulcrumed at its forward end (see Figs. 14 and 15) to a bracket $l^7$, depending from the front rail of the front frame part. The lever extends rearwardly and is connected at its rear end by links $l^8$ to the yoke $k^8$ for the links connecting with the forming-levers. The wrist-pin of the crank $l^3$ is adjustable toward and from the crank-shaft to provide an adjustable throw of the crank in any suitable manner—for instance, by an adjusting-screw $l^9$, carried by the crank and engaging a block which carries the wrist-pin and which slides in an undercut groove in the crank, Figs. 16 and 17. The link is also adjustable in length, for which purpose it is made in two parts, which are provided, respectively, with right and left hand screw-threads and are connected by a turnbuckle.

The forming-levers are capable of swinging freely toward and from the horn and are unrestrained in their rocking movement on the movable head or support $k$, to which they are pivoted. The actuating-yoke $k^8$ is moved up and down by the rear end of the actuating-lever $l^6$. In the lowermost position of the yoke (shown in Fig. 18) the free ends of the forming-levers are spread apart and stand below the flat blank which has been fed in between the levers and the horn. The first or initial part of the movement of the lever-actuating device or yoke $k^8$ toward the horn does not move the head or lever support $k$, but simply swings the levers toward each other until their free ends bear against the blank and horn on the under side of the latter near the middle thereof, as shown in Fig. 19. The further movement of the actuating device or yoke toward the horn moves the head or support $k$ toward the horn and causes the free ends of the levers to follow the curvature or surface of the horn and to press the blank tightly against the horn and to wrap or roll it around the horn. The free ends of the levers first recede from each other or spread during this upward wrapping or rolling movement and then approach each other until the movement is completed, which the levers can do, owing to the flexible connection established by the links $k^7$ between the levers and their actuating device or yoke $k^8$. When this movement is completed, the parts are in the position shown in Fig. 20, in which the ends of the levers bear on the edge portions of the blank on the upper side of the horn and the hooks of the blank overlap. The rollers are held in this position for a short period, owing to the intermittent movement of the crank-shaft before mentioned, and while the edges of the blank are held down by the rollers the horn is expanded to interlock the hooks and the hammer is dropped to close or lock the seam.

In my improved mechanism the forming-levers are entirely unrestrained except by the horn and are guided solely by the latter and follow the surface thereof closely. This causes the forming devices or levers to roll out the blank and remove any creases or similar imperfections which may exist in the blank and enables the levers to operate upon blanks of different thickness equally well and without requiring any adjustment and to operate upon horns of different sizes and forms.

The vertically-sliding head carrying the forming-levers is provided in its front and rear vertical sides with guideways $m$, Figs. 2, 18 to 21, and 25, in which are located vertically-movable gripping devices M, the upper ends of which are immediately beneath the front and rear ends of the forming-horn and when moved upwardly are adapted to clamp the blank against the under side of the horn. These grippers are moved upwardly to clamp the blank by the frictional contact between the gripper and the sliding head when the latter is moved upwardly.

Figures 3, 10, 11:
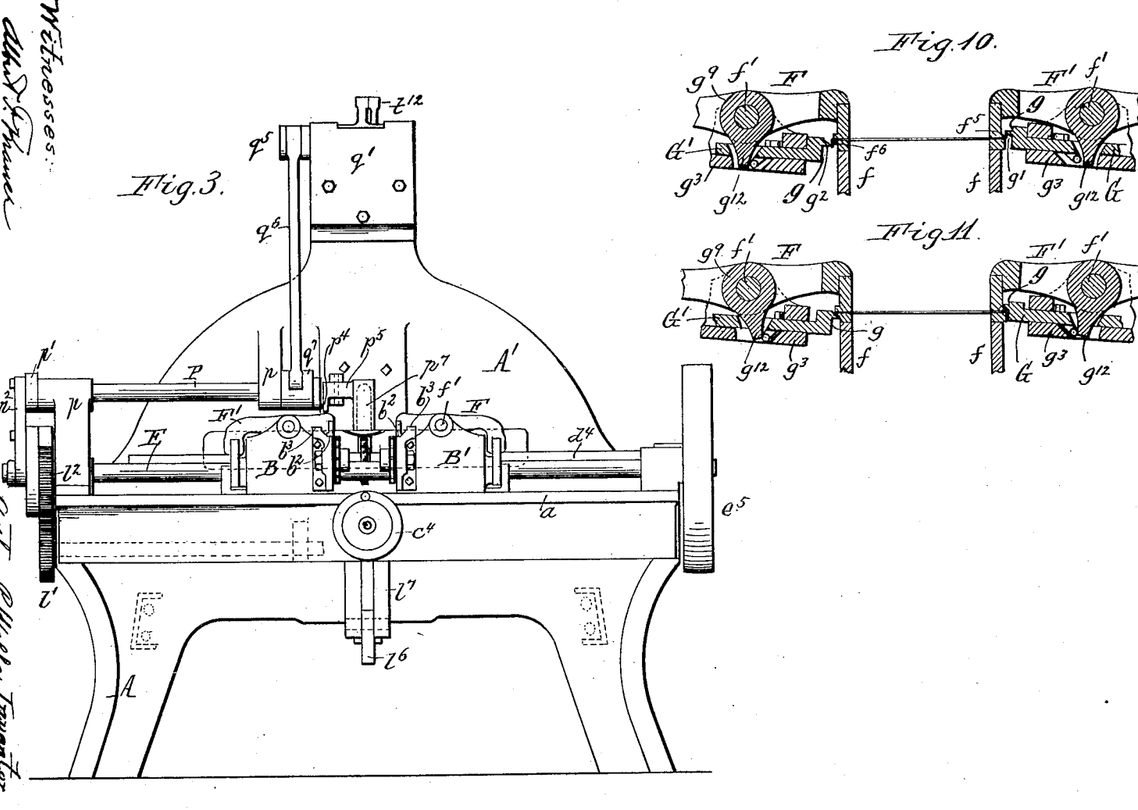
Fig. 3 is a front elevation of the machine.
Fig. 10 is an enlarged fragmentary sectional view showing the position of the edge-folders after the same have been tilted to bend the edges.
Fig. 11 is a similar view showing the position of the parts in completing the folding operation.

$m'$ represents set-screws, which pass through screw-threaded openings in the front upright frame member and engage against the front gripping device. By adjusting these screws the friction between the sliding head and its ways and between the grippers and the sliding head can be regulated, as required. When considerable friction is brought to bear on the sliding head, the pressure on the forming-levers is increased, and they are caused to bear with greater pressure on the blank of the horn. Thus by means of the set-screws the pressure of the rollers on the blank can be regulated to the desired or necessary extent. The grippers are arranged centrally beneath the forming-horn and are provided at their upper ends with slots $m^2$, through which the upper run of the secondary conveyer-chain passes, and also with slots $m^3$, through which the lower run of the chain passes. These slots are of sufficient length vertically to permit the movement of the grippers. In order to provide a support for the rear or overhanging end of the horn, which must be disconnected from the frame in order to permit the body-blanks to be moved rearwardly off of the same, the rear gripper is provided with means for locking it in its raised position when its upper end is in engagement with the blank and holds the same tightly against the under side of the forming-horn. This locking mechanism is shown in Figs. 2 and 3, and is as follows:

N represents a sliding bolt extending through an opening in the rear upright frame member $A^2$ and adapted to engage in an opening $n$, formed in the rear gripper, when the latter has been moved to the limit of its upward movement. The rear end of the bolt is connected to the upper arm of a lever $n'$, which is pivoted on the frame-upright, and the lower arm of which is loosely connected to the upper arm of a second lever $n^2$, pivoted intermediate of its ends to the frame-upright and having a lower forwardly curved or hooked end, which projects forwardly beneath a cross-web of the frame-upright and under the sliding head for the forming-levers.

$n^3$ represents a spring between the lever $n'$ and the upright, and which acts to move the bolt into the hole in the gripper. The bolt is moved out of engagement with the gripper by a stud $n^4$, depending from the sliding head for the forming-levers and adapted in the downward movement of the sliding levers to strike the hooked end of the lever $n^2$ and throw its upper end forward, which through the upper lever $n'$ retracts the bolt from engagement with the gripper. The gripper is then free to be moved downwardly out of engagement with the blank, and this is accomplished by means of the sliding head, which engages with projections $n^5$, extending inwardly from the lower ends of the grippers in the path of the sliding head.

The expanding-rod is moved longitudinally to expand the horn by suitable means, such as shown in Figs. 2, 3, 26, and 28, which is as follows:

P represents a horizontal rock-shaft which is journaled at the forward portion of the machine parallel with and above the drive-shaft in bearings $p$ on the frame. This shaft is provided at its outer end with a rock-arm $p'$, the outer end of which is pivoted to the upper end of a link $p^2$, the lower end of which is bifurcated or forked and straddles the drive-shaft E adjacent to the outer face of the gear-wheel $l^2$ on the drive-shaft. The gear-wheel $l^2$ is provided in its outer face with a cam-groove. A roller $p^3$, secured to the link $p^2$ between its ends, extends into said cam-groove. When the gear-wheel is rotated, the link is caused by the cam-groove and roller to reciprocate up and down, and thereby rock the rock-shaft P. At the inner end of the rock-shaft P is provided a crank-pin $p^4$, Figs. 26 and 28, which engages in a slot in one end of a lever $p^5$, pivoted intermediate of its ends on the front upright frame member. The lever oscillates in a horizontal plane and is connected at its opposite end to the forward end of the expanding-rod, which is arranged axially in the core of the forming-horn and extends forwardly through a slot $p^6$ in the front upright. The inner end of the lever is provided with a vertical extension $p^7$, having an undercut vertical groove $p^8$, in which a head on the expanding-pin engages. This construction enables the connection of the lever with the expanding-pin in horns of different characters and in which the expanding-pins are at different heights.

Q represents the hammer, which is mounted to slide vertically in ways $q$, provided therefor in the inner faces of the front and rear upright frame members $A'$ $A^2$. The upright frame members are connected at their upper end by a cross-head $q'$. A rock-shaft $q^2$ is journaled in bearings in this head and connected by a rock-arm $q^3$ and a link $q^4$ to the hammer. The shaft $q^2$ is provided with a rock-arm $q^5$ at one end thereof, the outer end of which is connected by a link $q^6$ to the forward end of a rock-arm $q^7$, secured to the inner end of the rock-shaft P. When the rock-shaft P is oscillated or rocked by the mechanism previously described, the hammer is lowered to close the seam.

R represents a horn extension or prolongation which projects rearwardly from the rear end of the horn proper. This horn extension supports the bodies while the seams are soldered. It is preferably made, as shown in Figs. 2 and 27, of longitudinally-arranged radial plates $r$, connected at the center of the horn extension and secured to the rear end of the forming-horn by end plates $r'$ and suitable bolts or the like passing through the end plates into the end of the forming-horn. The rear end of the horn extension, which projects into the yoke at the rear end of the frame extension, is supported, so as to prevent its sagging by means of two small rollers $r^2$, journaled in the yoke immediately beneath the bottom of the horn extension. The can-bodies pass between the rollers $r^2$ and the horn extension and bear on the rollers, which thus support the horn extension through the medium of the can-body.

S represents the device for applying flux to the seam of the can-body. The device is arranged above the forward portion of the horn extension and is preferably in the form of a wheel, of felt or the like, carried by a bracket $s$, which is secured to and vertically adjustable on the rear upright frame members, as by a bolt $s'$, passing through a slot in the bracket. The wheel is supplied with liquid flux from a tank $s^2$, which is supported on the upper member of the frame extension and is provided with a supply-pipe, which extends therefrom to a point over the flux-wheel and is provided with a valve $s^3$.

T represents a soldering-tool which is constructed with an upper solder-melting pot $t$ and a fire-chamber $t'$, immediately beneath the same.

$t^2$ represents a gas-pipe provided with a jet extending into the fire-chamber beneath the bottom of the melting-pot for heating the same. The soldering-iron is located immediately above the center of the horn extension and constitutes a part of the bottom of the fire-chamber.

$t^4$ indicates a solder-supply pipe leading from the solder-receptacle in front of the fire-chamber and adjacent to the same downwardly to a point above a trough $t^5$, secured to or formed with the soldering-iron. This trough has an elongated narrow opening $t^6$ in its bottom to deliver the solder therefrom on the seam of the can-body as the same is carried longitudinally past the soldering-tool by the secondary conveyer. The solder is fed from the receptacle to the trough in quantities sufficient to solder one can-seam by means of suitable controlling mechanism. In the mechanism shown in the drawings two turn-plug valves $t^7$ $t^8$ are provided in the solder-supply pipe one above the other. These valves are provided with stems connected to a link $t^9$ and are so arranged that when the upper valve is turned to open the supply-pipe the lower valve is turned to close the same. When the upper valve is open and the lower valve is closed, solder flows from the receptacle into the pipe between the two valves. When the valves are oscillated, the upper valve is turned to close the supply-pipe and the lower valve to open the pipe, so that the charge of solder contained in the pipe between the two valves is permitted to discharge into the soldering-trough and be supplied from the same to the can-body. The valves are rocked by an arm secured to one valve-stem and connected by a link $t^{10}$ to one arm of a bell-crank lever $t^{11}$, the other arm of which is connected by a link $t^{12}$ to a rock-arm on the shaft at the other end of the upright frame portion for operating the hammer. Any other suitable operating connections may be employed. The solder-supply pipe is kept hot to prevent the solder from hardening in the pipe by means of the flame from the heating-jet, which can pass through an opening made for the purpose in the wall of the fire-chamber adjacent to the solder-supply-pipe.

The operation of the machine is as follows: The blanks or flat sheets of metal from which the bodies are formed are placed by an attendant successively on the blank-supports at the front of the machine, with the front edge of the blank in rear of a pair of dogs or teeth on the primary conveyer-chains. The primary conveyer, which is driven intermittently, as described, carries the blank to the correct position between the opposite edge-folders and comes to rest with the blank supported near its opposite longitudinal or side edges on the inner horizontal walls $f$ of the folder-carriages. The operating-cams $f^3$ on the drive-shaft E for the clamping-levers are then brought to a position to swing the inner ends of the clamping-levers down to tightly clamp the blank on the supporting-walls $f$ of the carriages. The swinging frame for the folding-tool G' at one side of the blank is then tilted down, and the swinging frame for the other folding-tool G at the opposite side of the blank is tilted up to turn the edges of the blank respectively up and down. The cams $g^5$ on the drive-shaft E then while the swinging frames are tilted force the folding-tools inward or toward each other to complete the folding of the edges. Immediately after the edges are folded the operating-cams for operating the folding-tools and swinging frames return these parts to their initial position and the operating-cams for the clamping-levers permit the latter to rise and release the blank. The intermittent primary conveyer then moves another step and the teeth thereof carry the blank rearward from the edge-folders toward the forming-horn. When the teeth of the primary conveyer arrive at the rear sprocket-wheels, they leave the blank, and the teeth on the secondary conveyer H engage the forward edge of the blank, as before explained, and carry the latter a little farther rearward until they are in correct position below the forming-horn, when both conveyers again come to rest. At this stage in the operation the forming-rollers are down in the position shown in Fig. 18, beneath the blank. The crank-shaft L is then turned a half-revolution by its intermittent drive mechanism, which, through the actuating-lever $l^6$ and the described connections, causes the forming-rollers to move into the position shown in Fig. 19 and the grippers M to raise and hold the blank against the under side of the horn. The rollers then move up and roll the blank tightly around the horn, with its hooked edges overlapping, as shown in Fig. 20. The crank-shaft then comes to rest for a period of time, during which the rock-shaft P, through the described connections, moves the expanding-rod $j^7$ inwardly to expand the horn and causes the hooked edges of the sheet to interlock, and the rock-shaft P, through its connections with the hammer Q, also moves the latter down to close the seam, which completes the formation of the can-body. The crank-shaft then starts again and completes its revolution, which returns the forming-rollers to their initial position (indicated in Fig. 18) and the hammer is again raised. The downward movement of the sliding head $k$ moves the gripper down and releases the can-body. During the next period of rest of the forming-rollers in their lowered position the secondary conveyer H again moves and carries the formed blank beneath the flux-wheel S, which applies the flux to the seam, and the can-body is brought to rest with its rear end beneath and closing the discharge-opening in the solder-trough, into which a charge of solder sufficient for one seam has been supplied. By the next movement of the conveyer the can-body is carried past the soldering-iron and the solder is applied thereto and ironed in a well-known manner. While the machine is in operation the blanks are supplied to the primary conveyer as fast as it can carry them to the edge-folders, and as each blank is carried by successive movements of the conveyers to the successive operating mechanisms, as described, the several operations of folding, forming, fluxing, and soldering being performed simultaneously on different blanks.

The above-described arrangement and manner of securing the horn permits one horn to be quickly and easily detached from the machine and replaced by another. It is only necessary to remove the bolts $j$, which connect the horn with the front upright frame member and yoke at the rear of the frame extension. In moving the horn the expanding-rod is left connected to its operating-lever, and when another horn is placed in the machine it is slipped over the free rear end of the expanding-rod. Horns of different diameters are placed in the machine with their lower sides at the same elevation, which consequently changes the elevation of their centers. The sliding connection between the expanding-rod and its lever permits the rod to be moved vertically to suit different horns. When horns of different diameter are placed in the machine, the carriages carrying the edge-folding mechanism are adjusted to the proper distance apart to suit the blank for the new horn, the crank-pin of the operating-shaft for the formers and the link connecting the same with the actuating-lever are properly adjusted, and the hammer is raised or lowered by its adjustable link. The fluxing and soldering devices are also raised and lowered into proper relation with the can-body seam. By adjusting the crank wrist-pin the throw of the crank, and consequently the travel of the forming-levers, is properly regulated for horns of different diameter and by the adjustment of the link connecting the crank with the actuating-lever the forming-levers are adjusted toward and from the horn, so that at the commencement and finish of the stroke of the crank and forming-levers the rollers will occupy the same relative position to the horn irrespective of its diameter.

Fig. 22 illustrates the adaptability of the machine for making can-bodies of irregular shape in cross-section. In the construction shown in this figure the links connecting the lower ends of the forming-levers K to the yoke $k^8$ are adjustable in length in any convenient manner. They are shown as made up of inner and outer tubular threaded sections $u$, connected by screws formed with right and left hand threads. This construction permits the upper end of either forming-lever to be set nearer to or farther from the central vertical plane of the horn, which is necessary to produce an equal pressure on both sides of the horn when the yoke $k^8$, to which the links are connected, is held from lateral movement.

When the horn, constructed as before described, is expanded to cause the engagement of the seam-hooks, the upper ends of the expansible side portions do not swing outwardly at their upper ends, which would crease or bend the blank, but are bowed outwardly at their centers, so that the blank extends tangentially from the upper ends of the side portions to the top raised portion of the horn, and there is no bending or creasing tendency.

I claim as my invention—

1. In a machine for forming can-bodies, the combination of a horn, body-forming devices mounted to move freely toward and from the horn and adapted to bear with their free ends against the blank and press the latter against the horn, and flexible means for pressing and holding the free ends of the forming devices yieldingly against the blank and horn and moving said free ends around the horn, said forming devices being guided and controlled by said horn, substantially as set forth.

2. In a machine for forming can-bodies, the combination of a horn, body-forming levers pivoted to swing freely toward and from the horn and adapted to bear with their free ends against the blank and horn, an actuating device for said levers, and flexible means connecting said actuating device with said levers and pressing and holding the same with their free ends yieldingly against the blank and horn and moving said ends around the horn, said horn forming the guide for the free ends of said levers, substantially as set forth.

3. In a machine for forming can-bodies, the combination of a horn, body-forming devices mounted to move freely toward and from the horn and adapted to bear with their free ends against the blank and press the latter against the horn, and flexible means for pressing the free ends of the forming devices against the blank and horn and move said free ends around the horn, said forming devices being guided and controlled by said horn and otherwise unrestrained, substantially as set forth.

4. In a machine for forming can-bodies, the combination of a horn, body-forming levers pivoted to swing freely toward and from the horn and adapted to bear with their free ends against the blank and horn, an actuating device for said levers, and flexible means connecting said actuating device with said levers and pressing the same with their free ends against the blank and horn and moving said ends around the horn, said horn forming the guide for the free ends of said levers which are otherwise unrestrained, substantially as set forth.

5. In a machine for forming can-bodies, the combination of a horn, body-forming devices mounted to move freely toward and from said horn, a support for said forming devices capable of movement toward and from said horn, an actuating device for said forming devices capable of movement toward and from said horn independently of said support, and flexible connections between said actuating device and said forming devices, whereby said support is moved by said actuating device through the intervening connections and forming devices, substantially as set forth.

6. The combination of a horn, forming-levers pivoted to swing freely toward and from the horn and adapted to bear with their free ends against the blank and horn, a support to which said levers are pivoted and which is movable toward and from the horn, an actuating device for said levers which is movable toward and from the horn independently of said lever-support, and connections between said actuating device and said levers, whereby the movement of said actuating device toward the horn swings the levers toward each other until they strike the blank and horn and the further movement of the actuating device toward the horn moves the lever-support toward the horn and the free ends of the levers around the horn and causes the free ends of the levers to follow the surface of the horn and to press the blank against the same, substantially as set forth.

7. The combination of a horn, forming-levers adapted to bear with their free ends against the blank and horn, a support which is capable of movement toward and from said horn and to which said levers are pivoted, an actuating-yoke which is capable of movement toward and from said horn independently of said lever-support, and links connecting said yoke with said levers, substantially as set forth.

8. The combination of a stationary horn, a sliding head movable toward the horn, a pair of forming-levers pivoted intermediate of their ends to said sliding head, links connected to one arm of each lever, means movable toward said horn and connected to said links for operating the forming-levers, and means for holding said operating means from lateral movement, substantially as set forth.

9. The combination of a stationary forming-horn, a sliding head movable toward said horn, a pair of forming-levers pivoted on said sliding head, means connected to said levers for moving said sliding head toward said horn and swinging said levers toward each other, said movement of the levers toward each other being resisted by said forming-horn, whereby said levers are caused to follow the contour of the horn, and means for frictionally resisting the movement of said sliding head, substantially as set forth.

10. The combination of a stationary horn, a sliding head movable toward the horn, a pair of forming-levers pivoted intermediate of their ends to said sliding head, a forming-roller carried by one arm of each lever, links connected to the other arms of the levers, means movable toward said horn and connected to said links for operating the forming-levers, means for holding said operating means from lateral movement, and means for frictionally resisting the movement of said sliding head, substantially as set forth.

11. The combination of a stationary horn, a sliding head movable toward the horn, a pair of forming-levers pivoted intermediate of their ends to said sliding head, links connected to one arm of each lever, an actuating-lever connected to said links, a crank, and a link connecting said crank and lever, substantially as set forth.

12. The combination of a stationary horn, a sliding head movable toward the horn, a pair of forming-levers pivoted intermediate of their ends to said sliding head, links connected to one arm of each lever, an actuating-lever connected to said links, a crank provided with an adjustable wrist-pin, and an adjusting-link connecting said wrist-pin and said actuating-lever, substantially as set forth.

13. The combination of a forming-horn, a forming-lever or the like provided with a forming-roller, a roller mounted in advance of the forming-roller, and means whereby said rollers are movably mounted on said forming-lever or the like so as to roll on the blank on the horn and follow the contour of the latter, substantially as set forth.

14. The combination of a forming-horn, a forming-lever or the like, journal-blocks for forming-rollers pivoted on said lever, and rollers journaled in said journal-blocks eccentrically to the pivots for the blocks and at different distances therefrom, substantially as set forth.

15. The combination of a stationary forming-horn, a sliding head movable toward the same, forming-levers pivoted to said sliding head to swing toward each other, means connected to said levers for moving said sliding head toward said horn and swinging said levers toward each other, and a gripping device which is operated by said sliding head for holding the blank against the horn, substantially as set forth.

16. The combination of a forming-horn, means for forming the blank around the horn, a movable gripper for holding the blank against the horn, a stationary frame, a locking device for the gripper arranged in said frame, and mechanism for applying said locking device to the gripper and releasing the locking device therefrom, substantially as set forth.

17. The combination of a forming-horn, means for forming the blank around the horn, a gripper movable toward the horn to hold the blank against the horn, a bolt movable in the machine-frame and adapted to engage said gripper to hold the latter rigidly, and a lever connected to said bolt and arranged in the path of a part of said forming means, whereby the latter acts to throw said bolt to release said gripper, substantially as set forth.

18. The combination of a forming-horn, a sliding head movable toward the horn, forming-levers pivoted to said sliding head, means connected to said forming-levers for moving said sliding head toward the horn and swinging said levers toward each other, and a gripper in frictional contact with said sliding head and moved by the same to hold the blank against the horn, substantially as set forth.

Witness my hand this 15th day of January, 1902.

ARTHUR P. WOLFE.

Witnesses:
JNO. J. BONNER,
C. M. BENTLEY.